(12) United States Patent
Liao et al.

(10) Patent No.: US 10,626,944 B2
(45) Date of Patent: Apr. 21, 2020

(54) MAGNETO-RHEOLOGICAL SERIES ELASTIC ACTUATOR

(71) Applicant: The Chinese University of Hong Kong, Shatin, N.T., Hong Kong (CN)

(72) Inventors: Wei-Hsin Liao, Ma On Shan (CN); Bing Chen, Hefei (CN); Ling Qin, Tai Po (CN); Xuan Zhao, Yingcheng (CN); Hao Ma, Xinyang (CN)

(73) Assignee: The Chinese University of Hong Kong, Shatin, N.T., Hong Kong (CN)

( * ) Notice: Subject to any disclaimer, the term of this patent is extended or adjusted under 35 U.S.C. 154(b) by 92 days.

(21) Appl. No.: 15/942,256

(22) Filed: Mar. 30, 2018

(65) Prior Publication Data

US 2018/0298973 A1    Oct. 18, 2018

(30) Foreign Application Priority Data

Apr. 14, 2017    (CN) .......................... 2017 1 0242884

(51) Int. Cl.
*H02K 41/00* (2006.01)
*F16F 1/38* (2006.01)
(Continued)

(52) U.S. Cl.
CPC ............ *F16F 1/3821* (2013.01); *F16F 1/027* (2013.01); *F16F 3/00* (2013.01); *H02K 7/14* (2013.01);
(Continued)

(58) Field of Classification Search
CPC ... F16F 1/3821; F16F 5/00; H02K 7/10; B25J 13/02; B25J 9/042
(Continued)

(56) References Cited

U.S. PATENT DOCUMENTS 5,650,704 A    7/1997  Pratt et al.
5,731,640 A *  3/1998  Dietrich .................. F16D 65/14
                                                                310/12.04
(Continued)

FOREIGN PATENT DOCUMENTS

CN        102562874 A    7/2012
CN        104589368 A    5/2015
(Continued)

*Primary Examiner* — Christopher P Schwartz
(74) *Attorney, Agent, or Firm* — Kilpatrick Townsend & Stockton LLP

(57) ABSTRACT

The present disclosure discloses an actuator, comprising a first torsion spring body and a second torsion spring body, each of the first torsion spring body and the second torsion spring body comprising: an inner ring; an outer ring; and a plurality of elastic units, connected in parallel between the inner ring and the outer ring. An outer ring of the first torsion spring body and an outer ring of the second torsion spring body are rigidly connected, and an inner ring of the first torsion spring body and an inner ring of the second torsion spring body are aligned with each other. The actuator further includes a motor element and a braking element. The motor element is for providing an output torque, and is connected with the inner ring of the first torsion spring body. The braking element is for providing a braking torque, and is connected with the inner ring of the second torsion spring body.

23 Claims, 5 Drawing Sheets

(51) Int. Cl.
*H02K 7/14* (2006.01)
*F16F 1/02* (2006.01)
*F16F 3/00* (2006.01)
*H02K 7/116* (2006.01)
*H02K 7/10* (2006.01)

(52) U.S. Cl.
CPC ............ *F16F 2236/08* (2013.01); *H02K 7/10* (2013.01); *H02K 7/1163* (2013.01)

(58) Field of Classification Search
USPC .......... 188/267, 267.1; 192/3.21, 3.23, 21.5; 74/490.01–490.12; 310/12.01, 20
See application file for complete search history.

(56) References Cited

U.S. PATENT DOCUMENTS

| | | |
|---|---|---|
| 5,915,513 A | 6/1999 | Isley, Jr. et al. |
| 6,186,290 B1 | 2/2001 | Carlson |
| 6,471,018 B1 | 10/2002 | Gordaninejad et al. |
| 6,494,039 B2 | 12/2002 | Pratt et al. |
| 6,879,065 B2 * | 4/2005 | Corbett, Jr. ............ H02K 29/03 192/141 |
| 7,467,629 B2 | 12/2008 | Rand |
| 7,891,474 B2 | 2/2011 | McDaniel |
| 8,291,788 B2 | 10/2012 | Ihrke et al. |
| 8,397,885 B2 | 3/2013 | Shiao et al. |
| 8,734,528 B2 | 5/2014 | Herr et al. |
| 8,950,286 B2 * | 2/2015 | Gosselin .................... B25J 3/04 74/490.05 |
| 2002/0108463 A1 | 8/2002 | Shaw et al. |
| 2005/0092570 A1 * | 5/2005 | Wen ...................... F16D 37/008 192/21.5 |
| 2006/0280575 A1 * | 12/2006 | Ruettiger ............... B60K 37/06 411/15 |
| 2008/0000744 A1 * | 1/2008 | Yasumoto ............ F16D 37/008 192/3.23 |
| 2009/0266670 A1 | 10/2009 | McDaniel |
| 2011/0067517 A1 | 3/2011 | Ihrke et al. |
| 2012/0312114 A1 | 12/2012 | Deegan |

FOREIGN PATENT DOCUMENTS

| | | |
|---|---|---|
| CN | 106286642 A | 1/2017 |
| WO | 2015/023340 A9 | 2/2015 |
| WO | 2017/052223 A1 | 3/2017 |
| WO | 2017/180968 A1 | 10/2017 |

\* cited by examiner

MAGNETO-RHEOLOGICAL SERIES ELASTIC ACTUATOR

CROSS-REFERENCE TO RELATED APPLICATIONS

This application claims the priority of Chinese Patent Application No. 201710242884.5, filed on Apr. 14, 2017, the content of which is incorporated herein by reference in its entirety.

TECHNICAL FIELD

The present disclosure relates to an actuator, specifically to a magneto-rheological series elastic actuator for a rehabilitation and walking aid robot.

BACKGROUND

At present, the number of patients having dyskinesia caused by diseases such as stroke, spinal cord injury, amputation is gradually increasing at home and abroad. Since these patients cannot walk like normal people, over long time, they will suffer from other diseases such as osteoporosis, muscle atrophy and obesity. A rehabilitation and walking aid robot such as a wearable exoskeleton suit, or an artificial limb can be worn on the patients having dyskinesia, to help the patients to conduct rehabilitation training, aid their walking, thereby improving their live quality.

An actuator is an important part of the rehabilitation and walking aid robot. It can determine the output torque and speed of the robot, thus determining the robot's performance. In traditional engineering applications, the driver is generally required to have a sufficient rigidity to achieve a precise control of the system. However, in the field of the rehabilitation and walking aid robot, the robot needs to interact with people. For safety, comfort and other considerations, it is usually necessary to reduce the rigidity of the actuator. In addition, since the robot needs to provide the auxiliary torque for the patients over a long period of time, it is usually necessary for the system to have a high energy efficiency.

However, actuators of rehabilitation and walking aid robot recently disclosed by research institutes at home and abroad mostly have relatively high rigidity, which cannot effectively buffer the external impact on the system. Moreover, they are required to provide high electrical current, resulting in low energy efficiency and security risks.

Therefore, there is a need for an actuator that can properly lower the system rigidity, reduce the influence of the external impact on the system, and at the same time having high energy efficiency and safety.

SUMMARY

The technical solution provided by the present disclosure at least partially solves the technical problem described above.

According to an aspect of the present disclosure, an actuator is provided, the actuator includes a first torsion spring body and a second torsion spring body, each of the first torsion spring body and the second torsion spring body including: an inner ring; an outer ring; a plurality of elastic units, connected in parallel between the inner ring and the outer ring. An outer ring of the first torsion spring body and an outer ring of the second torsion spring body are rigidly fastened, and an inner ring of the first torsion spring body and an inner ring of the second torsion spring body are aligned. The actuator further includes a motor element and a braking element. The motor element is used for providing an output torque, and is connected with the inner ring of the first torsion spring body. The braking element is used for providing a braking torque, and is connected with the inner ring of the second torsion spring body.

In an embodiment, the actuator may further include a power transmission element, and the motor element is connected with the inner ring of the first torsion spring body through the power transmission element.

In an embodiment, the power transmission element may be a planetary gearbox.

In an embodiment, angle sensors may be respectively set at the inner ring of the first torsion spring body and an end distal from the corresponding outer ring, and the inner ring of the second torsion spring body and an end distal from the corresponding outer ring, to measure a deformation difference generated by the inner ring of the first torsion spring body and the inner ring of the second torsion spring body.

In an embodiment, the angle sensors may include one or more of an absolute encoder, an incremental encoder and/or a potentiometer.

In an embodiment, the braking element may include: a rotating shaft, made of a high permeability magnetic material, and an end of the rotating shaft is connected with the inner ring of the second torsion spring body; a coil, wound around the rotating shaft; and a cavity, for accommodating a fluid, wherein the fluid is capable of generating a shear stress under an electromagnetic field effect induced by the coil.

In an embodiment, an axial section profile of the rotating shaft of the braking element may be a curve and/or a segmented polyline.

In an embodiment, the rotating shaft of the braking element may be an iron core rotating shaft.

In an embodiment, the fluid in the braking element may be a magneto-rheological fluid.

In an embodiment, a plurality of pairs of an inner silicon steel sheet and an outer silicon steel sheet may be arranged in the cavity of the braking element, and the fluid may be distributed in an overlapping area between the inner silicon steel sheets and the outer silicon steel sheets.

In an embodiment, the inner silicon steel sheets and the outer silicon steel sheets in the braking element may be designed in a disc form.

In an embodiment, two electrode ends of the coil of the braking element may be led out through a carbon brush respectively.

In an embodiment, the actuator may further include a transmission gear set, and a first transmission gear in the transmission gear set is connected with the other end of the rotating shaft.

In an embodiment, the transmission gear set may include one or more of a bevel gear, a spur gear and/or a worm gear.

According to another aspect of the present disclosure, an actuator is further provided. The actuator includes: a motor element, for providing an output torque; a braking element, for providing a braking torque; and a torsion spring, connected in series between the motor element and the braking element, to provide a flexible connection between the motor element and the braking element.

In an embodiment, the torsion spring includes a first torsion spring body and a second torsion spring body, each of the first torsion spring body and the second torsion spring body includes: an inner ring; an outer ring; and a plurality of elastic units, connected in parallel between the inner ring and the outer ring. The outer ring of the first torsion spring body and the outer ring of the second torsion spring body are rigidly connected, and the inner ring of the first torsion spring body and the inner ring of the second torsion spring body are aligned.

In an embodiment, the actuator further includes a power transmission element, the motor element is connected with the inner ring of the first torsion spring body through the power transmission element.

In an embodiment, the power transmission element may be a planetary gearbox.

In an embodiment, angle sensors are respectively set at the inner ring of the first torsion spring body and an end distal from the corresponding outer ring, and the inner ring of the second torsion spring body and an end distal from the corresponding outer ring, to measure a deformation difference generated by the inner ring of the first torsion spring body and the inner ring of the second torsion spring body.

In an embodiment, the braking element includes: a rotating shaft, made of a high permeability magnetic material, and an end of the rotating shaft is connected with the inner ring of the second torsion spring body; a coil, winding around the rotating shaft; and a cavity, for accommodating a fluid. The fluid is capable of generating a shear stress under an electromagnetic field effect induced by the coil.

In an embodiment, an axial section profile of the rotating shaft of the braking element may be a curve and/or a segmented polyline.

In an embodiment, two electrode ends of the coil of the braking element may be led out through a carbon brush respectively.

In an embodiment, the actuator further includes a transmission gear set, and a first transmission gear in the transmission gear set is connected with the other end of the rotating shaft.

In an embodiment, the transmission gear set may include one or more of a bevel gear, a spur gear and/or a worm gear.

The actuator configured as above has a pair of torsion spring bodies connected in series with the motor element in the transmission chain, which may effectively increase the flexibility of the system. In rehabilitation and walking aid robot applications, the series-connected torsion springs can also effectively buffer the external (such as the ground) impact on the system, and can store energy. The angle sensors may be designed at both ends of the torsion spring. By detecting the amount of the torsion spring deformation, the angle sensors can accurately acquire the output torque of the motor, thus achieving the function of the torque sensor. In addition, the transmission chain of the present invention is designed with a magneto-rheological braking element, and a smart material magneto-rheological fluid is used in the magneto-rheological braking element. When an electrical current is applied to the coil, an induced magnetic field is generated, and the magneto-rheological fluid generates a large shear stress under the magnetic field effect, so that a large output braking torque can be obtained with a smaller input current. The application of the magneto-rheological braking element in the process of rehabilitation training and walking aid of the patients having dyskinesia can greatly reduce the peak current of the motor element, thus improving the energy efficiency and safety of the system. In addition, the transmission chain of the present invention is also designed with a transmission gear set, which may change the transmission direction of the motor, so as to enable the entire actuator structure to be more compact.

BRIEF DESCRIPTION OF THE DRAWINGS

The above and other advantages of embodiments of the present disclosure will become more apparent by referring to the following detailed description of the accompanying drawings, the accompanying drawings are intended to illustrate rather than limit the exemplary embodiments of the present disclosure. In the drawings.

DETAILED DESCRIPTION OF EMBODIMENTS

Figure 1:
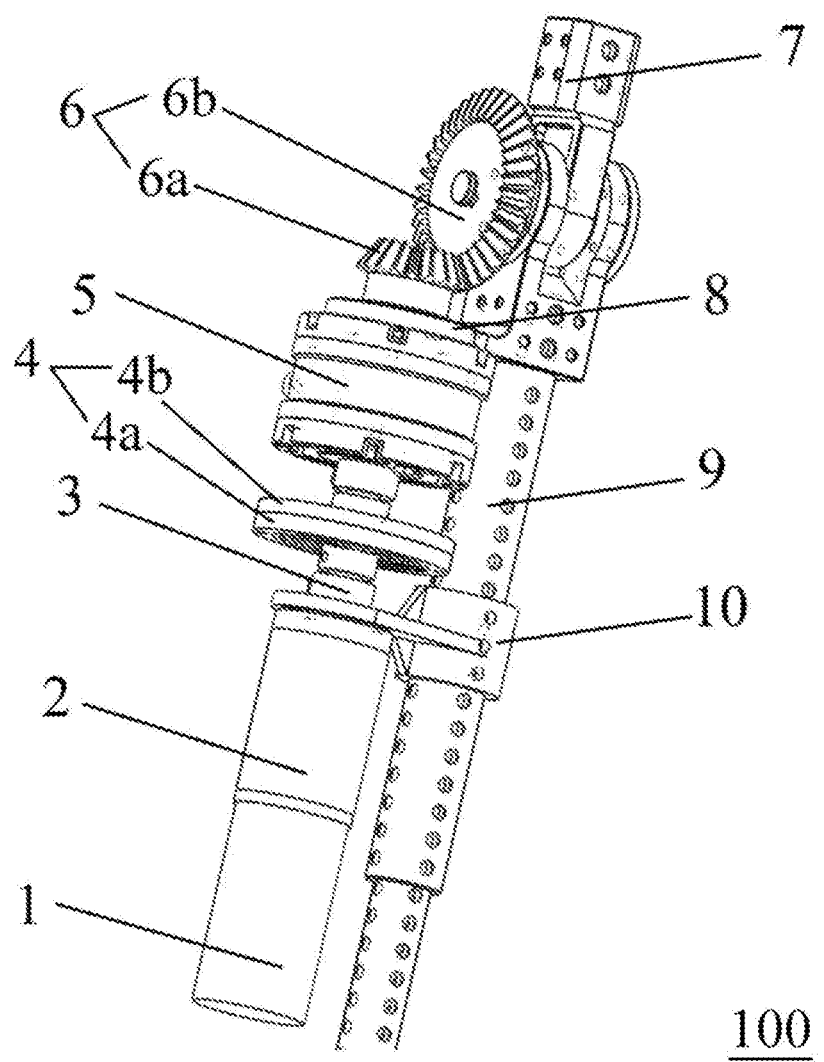
FIG. 1 is a schematic perspective structural view of an actuator according to an embodiment of the present disclosure.

For a better understanding of the present disclosure, various aspects of the present disclosure will be described in more detail with reference to the accompanying drawings. It should be understood that these detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be understood that in the present disclosure, when an element is referred to as being "on," "connected to" or "coupled to" another element, it can be directly on, connected or coupled to the other element or intervening elements may be present. When an element is referred to as being "directly on," "directly connected to" or "directly coupled to" another element, there are no intervening elements present.

It should be noted that in the present specification, the expressions "the first," "the second," etc. are used only to distinguish one feature from another, without indicating any limitation to the feature. Thus, the first torsion spring body discussed below may also be referred to as the second torsion spring body without departing from the teachings of the present disclosure.

Spatial relative terms such as "under," "below," "beneath," "over," "above," etc. may be used herein for convenience to describe the relationship of one element or feature and another element (additional elements) or another feature (additional features) as shown in the drawings. It should be understood that, in addition to the direction depicted in the drawings, the spatial relative terms are also intended to encompass different directions of the device in use or operation. For example, if the device in the drawings is turned over, an element described as "below" or "beneath" other elements or features would then be oriented as "above"

the other elements or features. Thus, the exemplary term "below" may encompass both of the directions above and below.

The terminology used herein is for the purpose of describing particular embodiments only and is not intended to limit the present disclosure. As used herein, the singular forms of features are intended to include the plural forms of features as well, unless the context clearly indicates otherwise. It should be further understood that the terms "comprising," "including," do not preclude the presence or addition of one or more other features, steps, elements, components and/or combinations thereof. Further, the use of "may," when describing embodiments of the present disclosure, indicates "one or more embodiments of the present disclosure." In addition, the term "exemplary" is intended to refer to an example or illustration.

As used herein, the terms "substantially," "about" and similar terms are used as terms of approximation and not as terms indicating degree, and are intended to describe the inherent deviations of a measurement value or a calculation value that will be understood by those of ordinary skill in the art.

Unless otherwise defined, all terms (including technical and scientific terms) used herein have the same meaning as those commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should be noted that, the embodiments in the present disclosure and the features in such embodiments may be combined with each other on a non-conflict basis. The present disclosure will be described in detail below with reference to the accompanying drawings and in combination with the embodiments.

The present disclosure will be further described below in combination with specific embodiments.

FIG. 1 is a schematic perspective structural view of an actuator 100 according to an embodiment of the present disclosure. The actuator 100 according to the exemplary embodiment of the present disclosure may include a motor element 1, a torsion spring 4, and a braking element 5. The motor element 1 may be installed on an actuator support 9 through a motor holder 10. The braking element 5 may be installed on the actuator support 9 through a fixing holder 8. The motor element 1 is connected with one end of the torsion spring 4, and the braking element 5 is connected with the other end of the torsion spring 4.

Figure 2A:
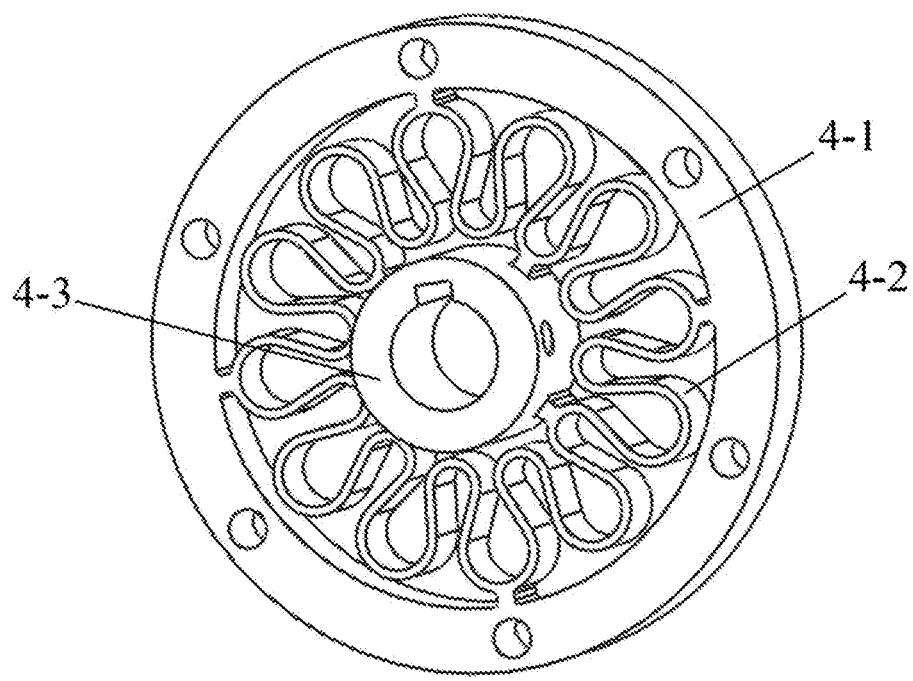
FIG. 2a is a schematic perspective structural view of a torsion spring body according to an embodiment of the present disclosure.
Figure 2B:
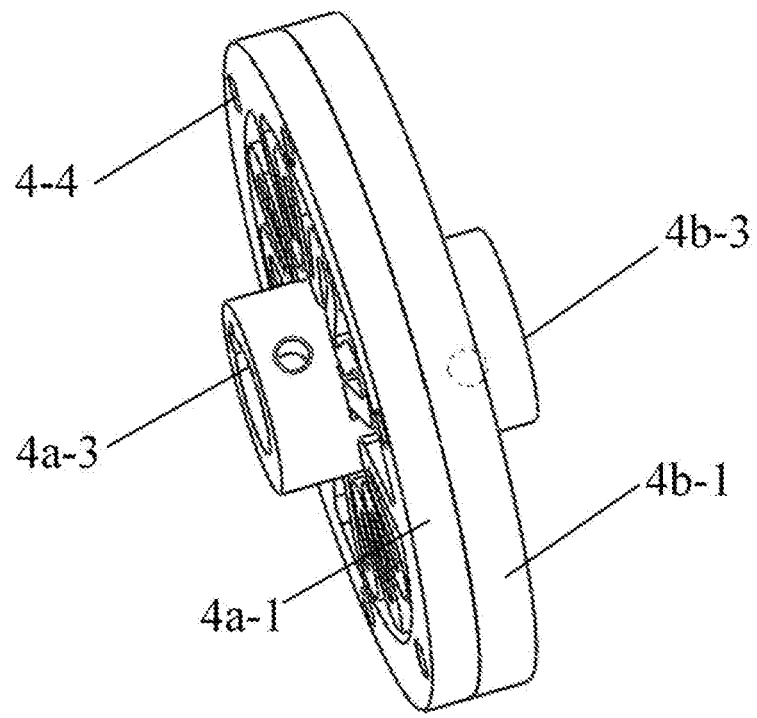
FIG. 2b is a schematic perspective structural view of a torsion spring according to an embodiment of the present disclosure.

The torsion spring 4 includes two torsion spring bodies cooperating with each other, i.e., a first torsion spring body 4a and a second torsion spring body 4b. FIG. 2a is a schematic perspective structural view of the first torsion spring body 4a or the second torsion spring body 4b according to an embodiment of the present disclosure; FIG. 2b is a schematic perspective structural view of the torsion spring 4 according to an embodiment of the present disclosure. As shown in the figures, each torsion spring body includes an outer ring 4-1, an inner ring 4-3, and a plurality of elastic units 4-2. The plurality of elastic units 4-2 are connected in parallel between the outer ring 4-1 and the inner ring 4-3 and are symmetrically distributed about the axis center of the inner ring 4-3, wherein a single elastic unit 4-2 is in an axisymmetric shape. The plurality of elastic units 4-2 have the same amount of deformation when subjected to the force in a clockwise or a counter-clockwise direction during the operation. The material of the elastic units may be spring steel, having excellent mechanical properties, relative stable long-term working performance, and miniscule stiffness coefficient change. The outer ring 4a-1 of the first torsion spring body 4a is rigidly connected with the outer ring 4b-1 of the second torsion spring body 4b; at the same time, the inner ring 4a-3 of the first torsion spring body 4a and the inner ring 4b-3 of the second torsion spring body 4b are aligned but not connected with each other. A plurality of through-holes 4-4 may be provided along the circumferential direction of the outer ring 4a-1 and the circumferential direction of the outer ring 4b-1, respectively, to rigidly fasten the outer ring 4a-1 and the outer ring 4b-1 by, for example, bolting.

The motor element 1 may be connected with the inner ring 4a-3 of the first torsion spring body 4a, and the braking element 5 may be connected with the inner ring 4b-3 of the second torsion spring body 4b. Since the first torsion spring body 4a and the second torsion spring body 4b are rigidly connected only through the outer ring 4a-1 and the outer ring 4b-1, a flexible connection between the motor element 1 and the braking element 5 is achieved. Connecting the torsion spring 4 with the motor element 1 in series may increase the flexibility of the system. In rehabilitation and walking aid robot applications, the torsion spring 4 can effectively buffer the impact on the system from the external environment such as the ground or the step, improve the safety performance of the system, so as to protect the user. At the same time, the torsion spring 4 can also effectively avoid potential damage to the motor element 1 that might be caused by instantaneous impact, so as to protect the motor element 1. In addition, the torsion spring 4 can also be used to store energy.

In one embodiment, the actuator 100 may further include a power transmission element 2. The motor element 1 may be connected with the inner ring 4a-3 of the first torsion spring body 4a through the power transmission element 2. The power transmission element 2 is provided between the motor element 1 and the first torsion spring body 4a so as to reduce the number of revolutions of the motor of the motor element 1 to the desired number of revolutions using the speed converter of the gear, and simultaneously obtain a large torque. Such an arrangement helps to reduce the input current of the motor and improve the energy efficiency and safety of the actuator system. The power transmission element 2 may be a planetary gearbox.

Figure 3:
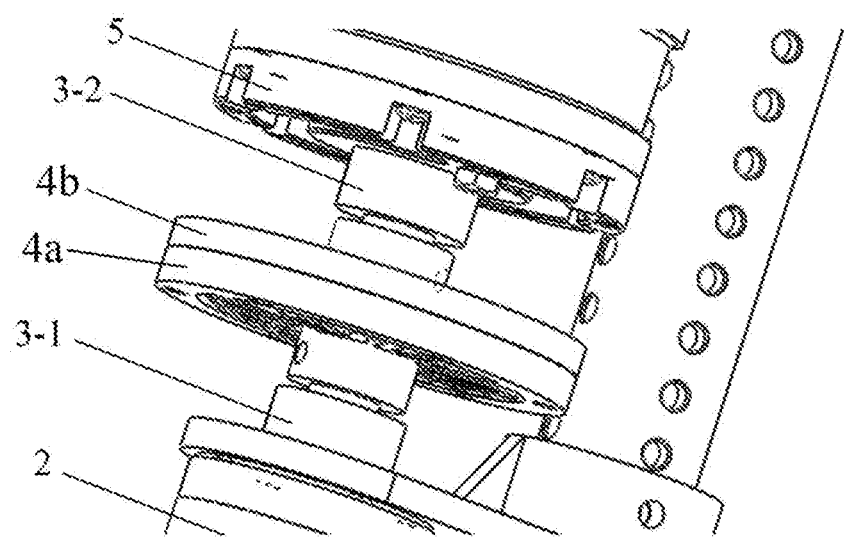
FIG. 3 is a schematic view of an installation position of an angle sensor according to an embodiment of the present disclosure.

In one embodiment, the actuator 100 may further include an angle sensor 3. FIG. 3 schematically shows the installation position of the angle sensor 3 according to an embodiment of the present disclosure. As shown in FIG. 3, a first angle sensor 3-1 may be installed on the inner ring of the first torsion spring body 4a away from the end of the corresponding outer ring; a second angle sensor 3-2 may be installed on the inner ring of the second torsion spring body 4b away from the end of the corresponding outer ring. The first angle sensor 3-1 and the second angle sensor 3-2 may accurately calculate the output torque of the motor element 1 by measuring the amount of deformation generated by the first torsion spring body 4a and the second torsion spring body 4b under the torque, and according to the rigidity of the torsion spring 4. The output torque of the motor element 1 calculated by the angle sensor 3 may be fed back to a controller (not shown) for the torque feedback control of the robot. The angle sensor 3 may include one or more of an absolute encoder, an incremental encoder, and/or a potentiometer.

Figure 4A:
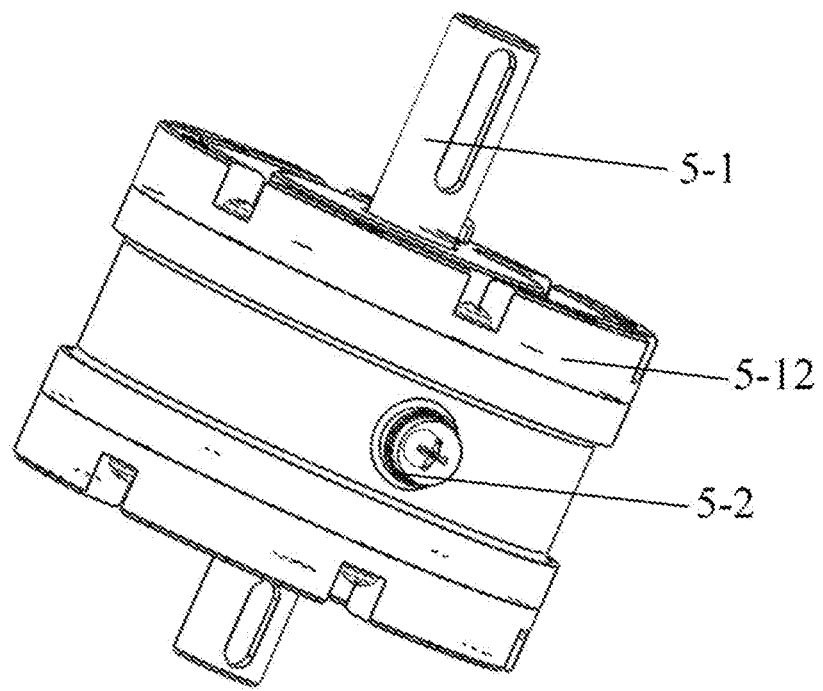
FIG. 4a is a schematic perspective structural view of a braking element according to an embodiment of the present disclosure.
Figure 4B:
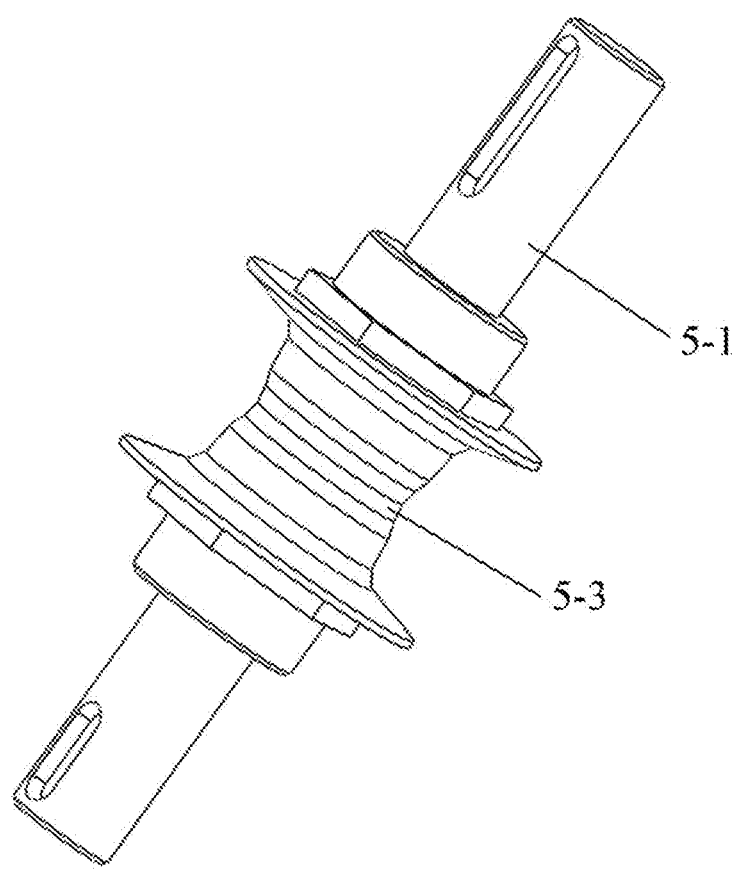
FIG. 4b is a schematic perspective structural view of a rotating shaft of the braking element according to an embodiment of the present disclosure.
Figure 4C:
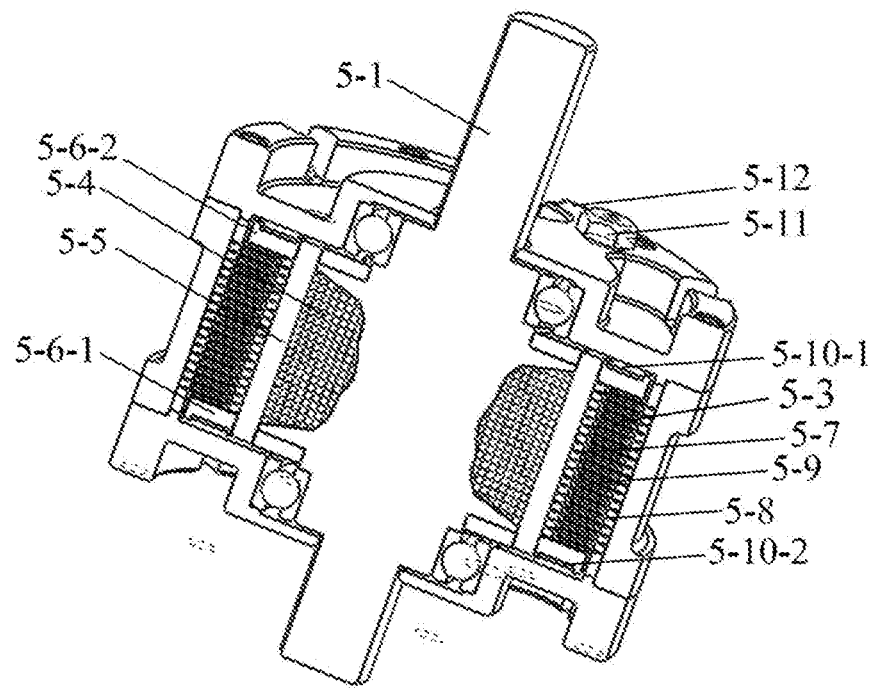
FIG. 4c is a schematic cross-sectional view of an internal structure of the braking element according to an embodiment of the present disclosure.
Figure 4D:
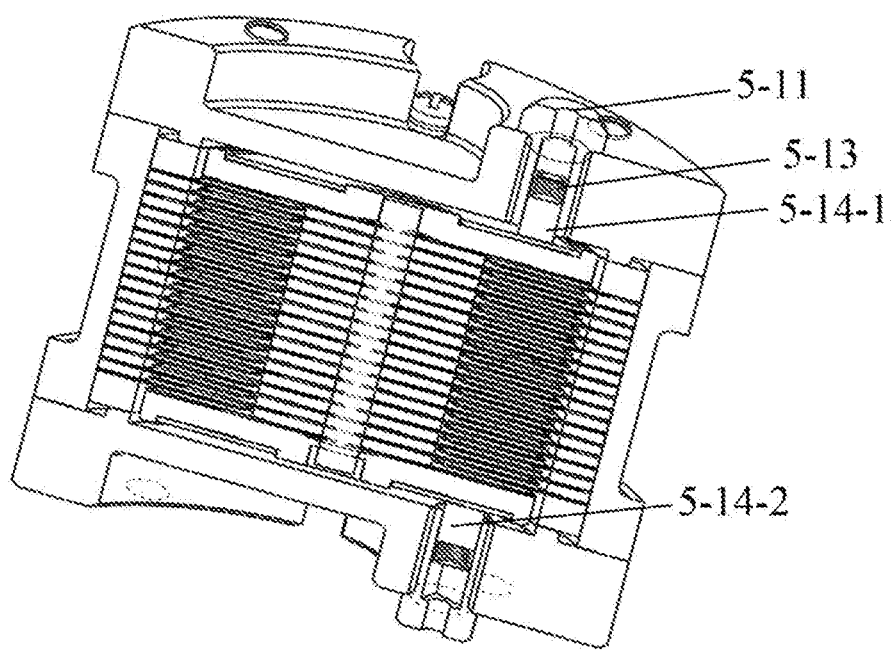
FIG. 4d is a schematic cross-sectional view of a carbon brush structure of the braking element according to an embodiment of the present disclosure.

The braking member 5 according to an exemplary embodiment of the present disclosure may include a rotating shaft 5-1, a coil 5-4, and a cavity 5-3. FIG. 4a is a schematic perspective structural view of the braking element 5 according to an embodiment of the present disclosure; FIG. 4b is a schematic perspective structural view of the rotating shaft 5-1 of the braking element 5 according to an embodiment of the present disclosure; FIG. 4c is a schematic cross-sectional view of an internal structure of the braking element 5 according to an embodiment of the present disclosure; FIG. 4d is a schematic cross-sectional view of a carbon brush structure 5-14-1 and a carbon brush structure 5-14-2 of the braking element 5 according to an embodiment of the present disclosure. As shown in the figures, the rotating shaft 5-1 is made of a high permeability magnetic material, one end 5-1-1 of the rotating shaft 5-1 may be connected with the second torsion spring body 4b, and the other end 5-1-2 may be connected with a transmission gear set 6. As an example, the rotating shaft 5-1 may be an iron core rotating shaft made of electric iron. The rotating shaft 5-1 adopts a variable cross-section design, and its axial section profile may be a curve and/or a segmented polyline to fully utilize the magnetic circuit space. The coil 5-4 is wound around the rotating shaft 5-1. When current flows through the coil 5-4, a magnetic field is generated, and the strength of the magnetic field will increase as the coil current increases. The cavity 5-3 serves to accommodate fluid 5-9. The fluid 5-9 in the cavity 5-3 can generate a shear stress under the electromagnetic field effect induced by the coil 5-4.

The braking element 5 may be a magneto-rheological braking element, and the fluid 5-9 in the cavity 5-3 may be a magneto-rheological (MR) fluid. The magneto-rheological fluid is a suspension composed of a mixture of fine, soft magnetic particles with high permeability and low hysteresis, and non-permeability liquid. The suspension exhibits Newtonian fluid characteristic with low viscosity under a zero magnetic field condition and exhibits Bingham body characteristic with high viscosity and low fluidity under a strong magnetic field. Since the rheology of the magneto-rheological fluid under the magnetic field effect is instantaneous and reversible, and its shear yield strength after the rheology has a stable correspondence with the magnetic field strength, the use of the magneto-rheological fluid may enable the braking element 5 to have a good stability and fast response time. In the meantime, since the magneto-rheological fluid may generate a high yield stress and consume less power under the magnetic field effect, it helps to improve the overall energy efficiency of the actuator system.

It will be understood by those skilled in the art that while the magneto-rheological (MR) fluid is used in the embodiments, it is possible to use, for example, the electro-rheological (ER) fluid and/or the electromagnetic-rheological (EMR) fluid to replace the magneto-rheological (MR) fluid.

In addition, using the magneto-rheological braking element may also achieve a friction-free braking of the system, i.e., the braking element 5 does not wear out due to the mutual contact and friction between elements during the braking process of the braking element 5, which may help to extend the service life of the actuator system.

As shown in FIG. 4c, the braking element 5 may include side plates 5-6-1 and 5-6-2 made of high permeability magnetic material. The side plate 5-6-1 and the side plate 5-6-2 may both be made of electric iron. A plurality of pairs of an inner silicon steel sheet 5-7 and an outer silicon steel sheet 5-8 are provided in the cavity 5-3. The silicon steel sheets are designed in a disc form, so that the braking element 5 has a relatively compact structure. The fluid 5-9 may be distributed in an overlapping area between the inner silicon steel sheets 5-7 and the outer silicon steel sheets 5-8.

An insulating layer 5-5 is provided between the coil 5-4 and the cavity 5-3, and the insulating layer 5-5 may be made of an aluminum alloy material. Both ends of the coil 5-4 are respectively connected to a copper plate 5-10-1 and a copper plate 5-10-2, and are connected to the outside through a carbon brush 5-14-1 and a carbon brush 5-14-2. The conductive, thermal and lubricating performance of the carbon brushes is good, and the carbon brushes also have good reversing and current collecting performance, and a long service life. The carbon brush 5-14-1 is installed in a hollow screw 5-11 and pressed by a spring 5-13, so as to be in close contact with the copper plate 5-10-1. The installation of the carbon brush 5-14-2 is J similar to the installation of carbon brush 5-14-1. The hollow screw 5-11 may be manufactured by 3D printing. The coil 5-4 and the cavity 5-3 are covered by a housing 5-12 of the braking element 5. A fluid injection hole 5-2 is provided on the housing 5-12 for injecting the fluid 5-9 into the cavity 5-3.

The actuator 100 described above may be used as a joint actuator in a rehabilitation and walking aid robot. In use, the actuator 100 may further include a transmission gear set 6. As shown in FIG. 1, the transmission gear set 6 may include a first transmission gear 6a and a second transmission gear 6b. The first transmission gear 6a is connected with the rotating shaft 5-1 of the braking element 5, and the second transmission gear 6b is connected with a joint connection 7. The transmission gear set 6 may change the directions of the output torque generated by the motor element 1 and the braking torque generated by the braking element 5 and transmit the torque with the changed direction to the joint connection 7. The design of the transmission gear set 6 makes it possible to arrange the motor element 1, the torsion spring 4 and the braking element 5 in parallel with the actuator support 9, in order to facilitate a compact structure of the actuator 100. In applications, the transmission gear set 6 may include one or more of the following gears: a bevel gear, a spur gear, a worm gear.

During the moving process of the robot, the joint actuator 100 needs to provide the joint connection 7 with different functions, such as a driving function or a braking function, at different stages.

When the actuator 100 is required to provide a driving function to the joint connection 7, the motor element 1 will output a driving torque that may be amplified by the power transmission element 2 and then transmitted to the torsion spring 4. The first torsion spring body 4a and the second torsion spring body 4b will bear the same torque. Due to the effect of the elastic unit 4-2, the inner ring 4a-3 of the first torsion spring body 4a and the inner ring 4b-3 of the second torsion spring body 4b will generate a deformation difference, the amount of deformation of the torsion spring 4 will be accurately measured by the first angle sensor 3-1 and the second angle sensor 3-2, and then the output torque of the motor element 1 will be accurately calculated based on the rigidity of the torsion spring 4. The calculated output torque is used in the torque feedback control of the robot. The output torque of the motor element 1 is transmitted to the rotating shaft 5-1 of the braking element 5 via the torsion spring 4. Since the actuator needs to provide the driving torque at this time, no current will flow through the coil 5-4 of the braking element 5, so the braking element 5 will not generate the braking torque. Finally, the output torque of the motor element 1 is transmitted to the joint connection 7 after being changed in direction by the transmission gear set 6, so as to realize the driving function.

When the actuator 100 is required to provide a braking function to the joint connection 7, and the required braking torque does not exceed the peak braking torque provided by the braking element 5, the motor element 1 will be in a non-operating state and will not provide the output torque. At this time, current will flow through the coil 5-4, so that an induced magnetic field will be generated in the braking element 5, and the fluid 5-9 will generate a large shear stress under the magnetic field effect. When the inner silicon steel sheet 5-7 rotates with the rotating shaft 5-1, it will cut the fluid 5-9, cause the braking element 5 to provide the required braking torque. Since the current in the coil 5-4 is controllable, the braking element 5 can generate a controllable braking torque. Finally, the braking torque generated by the braking element 5 is transmitted to the joint connection 7 after being changed in direction by the transmission gear set 6, so as to realize the braking function. In the case of providing the same braking torque, the current required by the braking element 5 is far less than the current required by the motor element 1, thereby effectively increasing the energy efficiency and safety of the system.

When the actuator 100 is required to provide a braking function to the joint connection 7 and the required braking torque exceeds the peak braking torque provided by the braking element 5, a hybrid braking function of the motor element 1 and the braking element 5 will be used. At this time, the motor element 1 will be in operation, providing the output torque. The output torque of the motor element 1 is amplified by the power transmission element 2 and then transmitted to the torsion spring 4, and further transmitted to the rotating shaft 5-1 of the braking element 5. At the same time, current will flow through the coil 5-4, so that an induced magnetic field will be generated in the braking element 5, and the fluid 5-9 will generate a shear stress under the magnetic field effect. When the inner silicon steel sheet 5-7 rotates with the rotating shaft 5-1, it will cut the fluid 5-9, cause the braking element 5 to provide the required braking torque. Since the motor element 1 and the braking element 5 are in series, the output torque of the motor element 1 amplified by the power transmission element 2 may be added to the braking torque generated by the braking element 5. Finally, the transmission gear set 6 changes the direction of the added torque and then transmits it to the joint connection 7, so as to realize the hybrid braking function of the motor element 1 and the braking element 5.

The foregoing is only a description of the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the spirit of the invention, such as, technical solutions formed by replacing the features as disclosed in the present disclosure with (but not limited to), technical features with similar functions.

What is claimed is:
1. An actuator, comprising:
a first torsion spring body; and
a second torsion spring body,
each of the first torsion spring body and the second torsion spring body comprising:
an inner ring;
an outer ring; and
a plurality of elastic units, connected in parallel between the inner ring and the outer ring;
the outer ring of the first torsion spring body and the outer ring of the second torsion spring body being rigidly fastened, and the inner ring of the first torsion spring body and the inner ring of the second torsion spring body being aligned,
a motor element for providing an output torque, and connected with the inner ring of the first torsion spring body; and
a braking element for providing a braking torque, and connected with the inner ring of the second torsion spring body.

2. The actuator according to claim 1, wherein the actuator further comprises a power transmission element, the motor element is connected with the inner ring of the first torsion spring body through the power transmission element.

3. The actuator according to claim 2, wherein the power transmission element is a planetary gearbox.

4. The actuator according to claim 1, wherein angle sensors are respectively set at the inner ring of the first torsion spring body and an end distal from the corresponding outer ring, and the inner ring of the second torsion spring body and an end distal from the corresponding outer ring, to measure a deformation difference generated by the inner ring of the first torsion spring body and the inner ring of the second torsion spring body.

5. The actuator according to claim 4, wherein the angle sensors comprise one or more of an absolute encoder, an incremental encoder and/or a potentiometer.

6. The actuator according to claim 1, wherein the braking element comprises:
a rotating shaft, made of a high permeability magnetic material, and an end of the rotating shaft is connected with the inner ring of the second torsion spring body;
a coil, wound around the rotating shaft; and
a cavity, for accommodating a fluid,
wherein the fluid is capable of generating a shear stress under an electromagnetic field effect induced by the coil.

7. The actuator according to claim 6, wherein an axial section profile of the rotating shaft is a curve and/or a segmented polyline.

8. The actuator according to claim 6, wherein the rotating shaft is an iron core rotating shaft.

9. The actuator according to claim 6, wherein the fluid is a magneto-rheological fluid.

10. The actuator according to claim 6, wherein a plurality of pairs of an inner silicon steel sheet and an outer silicon steel sheet are arranged in the cavity, and the fluid is distributed in an overlapping area between the inner silicon steel sheets and the outer silicon steel sheets.

11. The actuator according to claim 10, wherein the inner silicon steel sheets and the outer silicon steel sheets are designed in a disc form.

12. The actuator according to claim 6, wherein two electrode ends of the coil are led out through a carbon brush respectively.

13. The actuator according to claim 6, wherein the actuator further comprises a transmission gear set, and a first transmission gear in the transmission gear set is connected with the other end of the rotating shaft.

14. The actuator according to claim 13, wherein the transmission gear set comprises one or more of a bevel gear, a spur gear and/or a worm gear.

15. An actuator, comprising:
a motor element, for providing an output torque;
a magneto-rheological braking element, for providing a braking torque; and a torsion spring, connected in series between the motor element and the magneto-rheological braking element, to provide a flexible connection between the motor element and the magneto-rheological braking element, wherein the torsion spring comprises a first torsion spring body and a second torsion spring body, each of the first torsion spring body and the second torsion spring body comprises:

an inner ring;

an outer ring; and a plurality of elastic units, connected in parallel between the inner ring and the outer ring;

wherein, the outer ring of the first torsion spring body and the outer ring of the second torsion spring body are rigidly fastened, and the inner ring of the first torsion spring body and the inner ring of the second torsion spring body are aligned.

16. The actuator according to claim 15, wherein the magneto-rheological braking element comprises:

a rotating shaft, made of a high permeability magnetic material, and an end of the rotating shaft is connected with the inner ring of the second torsion spring body;

a coil, wound around the rotating shaft; and a cavity, for accommodating a magneto-rheological fluid, wherein the magneto-rheological fluid is capable of generating a shear stress under an electromagnetic field effect induced by the coil.

17. The actuator according to claim 16, wherein the actuator further comprises a transmission gear set for changing a torque transmission direction, and a first transmission gear in the transmission gear set is connected with the other end of the rotating shaft.

18. The actuator according to claim 17, wherein the transmission gear set comprises one or more of a bevel gear, a spur gear and/or a worm gear.

19. The actuator according to claim 16, wherein an axial section profile of the rotating shaft is a curve and/or a segmented polyline.

20. The actuator according to claim 16, wherein two electrode ends of the coil are led out through a carbon brush respectively.

21. The actuator according to claim 15, wherein the actuator further comprises a power transmission element, the motor element is connected with the inner ring of the first torsion spring body through the power transmission element.

22. The actuator according to claim 21, wherein the power transmission element is a planetary gearbox.

23. The actuator according to claim 15, wherein angle sensors are respectively set at the inner ring of the first torsion spring body and an distal away from the corresponding outer ring, and the inner ring of the second torsion spring body and an end distal from the corresponding outer ring, to measure a deformation difference generated by the inner ring of the first torsion spring body and the inner ring of the second torsion spring body.

* * * * *